(12) United States Patent
Morris et al.

(10) Patent No.: US 10,530,481 B1
(45) Date of Patent: Jan. 7, 2020

(54) HYPERSCALE PHOTONICS CONNECTIVITY SOLUTION

(71) Applicant: HEWLETT PACKARD ENTERPRISE DEVELOPMENT LP, Houston, TX (US)

(72) Inventors: Terrel Morris, Garland, TX (US); Daniel Alan Berkram, Loveland, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/057,626

(22) Filed: Aug. 7, 2018

(51) Int. Cl.
*H04B 10/40* (2013.01)
*G02B 6/42* (2006.01)
*H04Q 11/00* (2006.01)

(52) U.S. Cl.
CPC ........... *H04B 10/40* (2013.01); *G02B 6/4284* (2013.01); *H04Q 11/0005* (2013.01); *H04Q 11/0062* (2013.01); *H04Q 2011/0069* (2013.01)

(58) Field of Classification Search
CPC combination set(s) only.
See application file for complete search history.

(56) References Cited

U.S. PATENT DOCUMENTS

| | | | |
|---|---|---|---|
| 6,796,716 B1 * | 9/2004 | Handforth | G02B 6/3897 385/147 |
| 8,200,097 B2 | 6/2012 | Cole | |
| 8,315,057 B2 | 11/2012 | Xu et al. | |
| 8,358,934 B2 | 1/2013 | Hinderthuer et al. | |
| 8,503,879 B2 | 8/2013 | Xu et al. | |
| 9,088,119 B2 | 7/2015 | Baker | |
| 9,391,706 B2 | 7/2016 | Lewis et al. | |
| 9,553,689 B2 | 1/2017 | Kato | |
| 9,585,032 B2 | 2/2017 | Thyni | |
| 9,894,427 B2 | 2/2018 | Sindhu et al. | |

(Continued)

OTHER PUBLICATIONS

Yan et al.; "HiFOST: A Scalable and Low-Latency Hybrid Data Center Network Architecture Based on Flow-Controlled Fast Optical Switches", J. Opt. Commun. Netw., vol. 10, Jul. 2018, pp. B1-B14.

(Continued)

*Primary Examiner* — Omar S Ismail
(74) *Attorney, Agent, or Firm* — Nolte Intellectual Property Law Group (57) ABSTRACT

The present disclosure provides an effective solution to employ hyperscale photonics connectivity using existing server connections. The solution described in the present disclosure eliminates top-of-rack switches and facilitates a manner for servers to connect directly to middle-of-row switches. An apparatus consistent with the present disclosure includes a primary transceiver device. The primary server-end transceiver device comprising a photonics transceiver and a first electrical transmitter. The apparatus further includes a first secondary server-end transceiver device, the first secondary server-end transceiver device comprising a second electrical transmitter. In addition, a first electrical cable electrically couples the primary server-end transceiver to the first secondary server-end transceiver device. The present disclosure enables the use of an input fiber connection and a photonics transceiver to effect two sets of electrical connections on different servers.

17 Claims, 8 Drawing Sheets

(56) References Cited

U.S. PATENT DOCUMENTS

| | | | |
|---|---|---|---|
| 9,965,433 B2 | 5/2018 | Tomada | |
| 2004/0195944 A1* | 10/2004 | Sugihara | H05K 7/1495 |
| | | | 312/283 |
| 2005/0282413 A1 | 12/2005 | Israel et al. | |
| 2012/0008945 A1 | 1/2012 | Singla et al. | |
| 2014/0169499 A1* | 6/2014 | Riani | H04L 27/34 |
| | | | 375/298 |
| 2014/0205243 A1* | 7/2014 | Baker | H01R 31/005 |
| | | | 385/77 |
| 2015/0086214 A1* | 3/2015 | Lewis | H04B 10/40 |
| | | | 398/135 |
| 2015/0237421 A1* | 8/2015 | Morgan | H04Q 11/0005 |
| | | | 398/45 |
| 2016/0091685 A1* | 3/2016 | Raza | G02B 6/4452 |
| | | | 398/19 |
| 2016/0342563 A1* | 11/2016 | Tomada | G06F 13/4027 |
| 2017/0134836 A1* | 5/2017 | Sindhu | H04Q 11/0066 |
| 2018/0027313 A1 | 1/2018 | Adiletta et al. | |
| 2018/0191115 A1* | 7/2018 | Khazen | H01R 31/06 |
| 2018/0375577 A1* | 12/2018 | Leigh | H04B 10/25 |

OTHER PUBLICATIONS

Lugones, D., et al; "A Reconfigurable Optical/Electrical Interconnect Architecture for Large-scale Clusters and Datacenters"; May 15-17, 2012; 10 pages.

Farrington et al., "Helios: a Hybrid Electrical/optical Switch Architecture for Modular Data Centers"; Proceedings of the ACM SIGCOMM 2010 conference, SIGCOMM '10, 2010, 12 pages.

Finisar Demonstrates New 400G, 200G and 100G Pluggable Optical Modules and Introduces Flexgrid® Single Low Profile Wavelength Selective Switch at OFC 2017, Mar. 21, 2017, http://investor.finisar.com/news-releases/news-release-details/finisar-demonstrates-new-400g-200g-and-100g-pluggable-optical>.

* cited by examiner

HYPERSCALE PHOTONICS CONNECTIVITY SOLUTION

BACKGROUND

As numbers of computers, particularly servers, are deployed in large-scale or hyper-scale data center applications, the need to connect those computers to one another at massive scale as well as to connect them to the outside world has driven change in data center networking topologies and strategies.

Two of the primary drivers of cost and performance in these large networks are the network topology and the photonic interconnections between them. The trend has been to utilize many low-cost low-radix switches that are connected to other low-radix switches via many connections, both copper and optical. As the networks increase efficiency by increasing data rate, the distances that can be traversed by copper cables are diminished. As a result, the ratio of copper cables to optical cables has trended increasingly in favor of optical cables.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

The description of the different advantageous embodiments has been presented for purposes of illustration and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular embodiments only and is not intended to limit the scope of the present disclosure.

It must be noted that as used herein, and in the claims, the singular forms "a," and "the" include plural referents unless the context clearly dictates otherwise.

Figure 1:
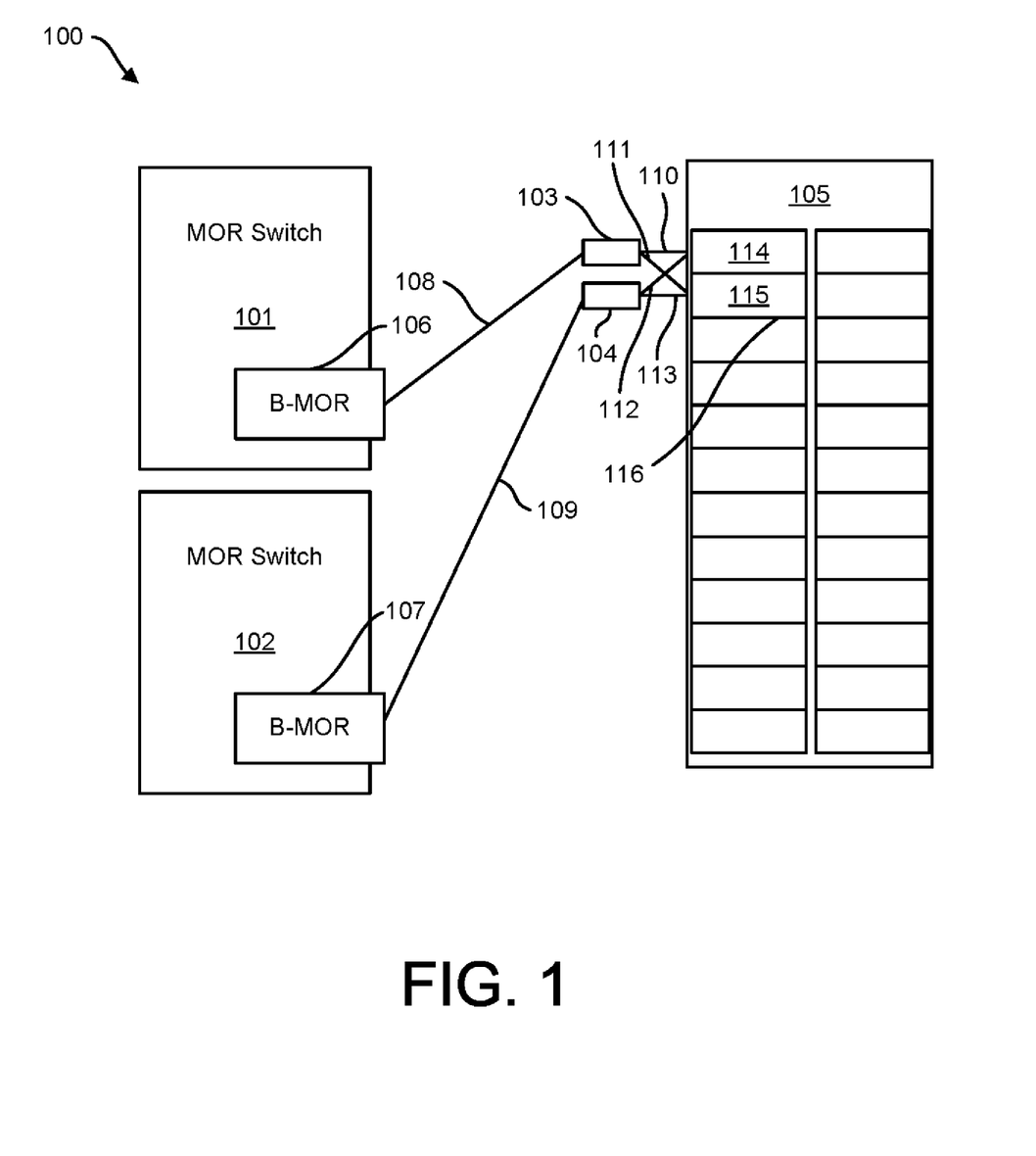
FIG. 1 is an illustration of a system comprising a pair of middle-of-row (MOR) switches redundantly connected to server systems within a rack consistent with one embodiment of the present disclosure.

FIG. 1 is an illustration of a system 100 comprising a pair of middle-of-row (MOR) switches 101, 102 directly and redundantly connected to a server rack 105 within a rack consistent with one embodiment of the present disclosure.

MOR switches 101, 102 include MOR-compliant optical transmitters 106, 107. In some embodiments, the MOR-compliant optical transmitters 106, 107 employ coarse wavelength division multiplexing (CWDM) photonics technology and can have one or more optical connections. Alternatively, they may have multiple optical cables in a bundle or ribbon, all producing the same wavelength. In the embodiment shown, each MOR-compliant optical transmitter 106, 107 may have 24 electrical channels per direction. Employing an CWDM implementation with four wavelengths, all 24 channels can be deployed within six optical fibers per direction. However, a skilled artisan will appreciate that the present disclosure is not limited thereto. MOR-compliant optical transmitters 106, 107 can transmit optical signals to a photonics transceiver apparatus attached to a server.

FIG. 1 further illustrates a server rack 105 which houses multiple servers 114, 115 may be equipped with dual sets of server-end QSFP-compliant devices 103, 104.

Herein, QSFP-compliant is defined as a device which is configured to operate, in whole or in part, according to the QSFP, QSFP-DD, or OSFP specifications. For example, a device which is QSFP-compliant may be QSFP form-compliant, QSFP electrical-signaling compliant, etc., so long as the device operates within the spirit and scope of the present disclosure. In one embodiment, a set of server-end transceiver devices are QSFP, QSFP-DD, or OSFP compliant if they comply with the form-factor and electrical signaling requirements of the QSFP, QSFP-DD, or OSFP specifications. However, these server-end transceiver devices may employ a cable routing configuration which deviates from the cable routing requirements defined in one or more of the QSFP, QSFP-DD, or OSFP specifications.

The server-end QSFP-compliant devices 103, 104 may each function to convert optical signals 108, 109 into electrical signals 110, 111, 112, 113 which may be received by Network Interface Card (NIC) or other network adapter devices connected to servers 114, 115. An exemplary connection for these devices is in the form of a card internal to the server enclosure, but other mechanisms are possible as long as they do not take away from the spirit and scope of the present disclosure. The server-end QSFP-compliant devices 103, 104 are to be physically installed into QSFP ports of server enclosures 114, 115. In some implementations, the pair of MOR switches 101, 102 and server-end QSFP-compliant devices 103, 104 are redundantly connected to servers within server rack 105.

Herein, redundancy is defined as the duplication of critical components or functions of a system with the intent to increase the reliability of a system, usually in the form of a backup or fail-safe, or to improve actual system performance.

It should be noted that although the present example shows a CWDM system having four colors and thus producing four electrical channels per optical connection, it is possible to produce more or fewer electrical channels per optical connection. This may be accomplished using additional fibers per connection, using additional or fewer wavelengths per fiber, adding levels per fiber such as PAM-4 and PAM-8 ranging to PAM-N configurations, or using various encoding and decoding schemes involving coherence, polarization, or other techniques.

Server rack 105 contains a plurality of shelves (or racks) 116 with servers 114, 115 stationed therein. Most notably, the server system shown can scale to meet the demands of hyperscale systems which employ hundreds to thousands of servers within a server system. In some embodiments, the switches employ speeds at 50 Gbps-400 Gbps in accordance with one embodiment of the present disclosure.

Advantageously, the present disclosure enables the use of an input fiber connection and a photonics transceiver to effect two sets of electrical connections on different servers.

Figure 2:
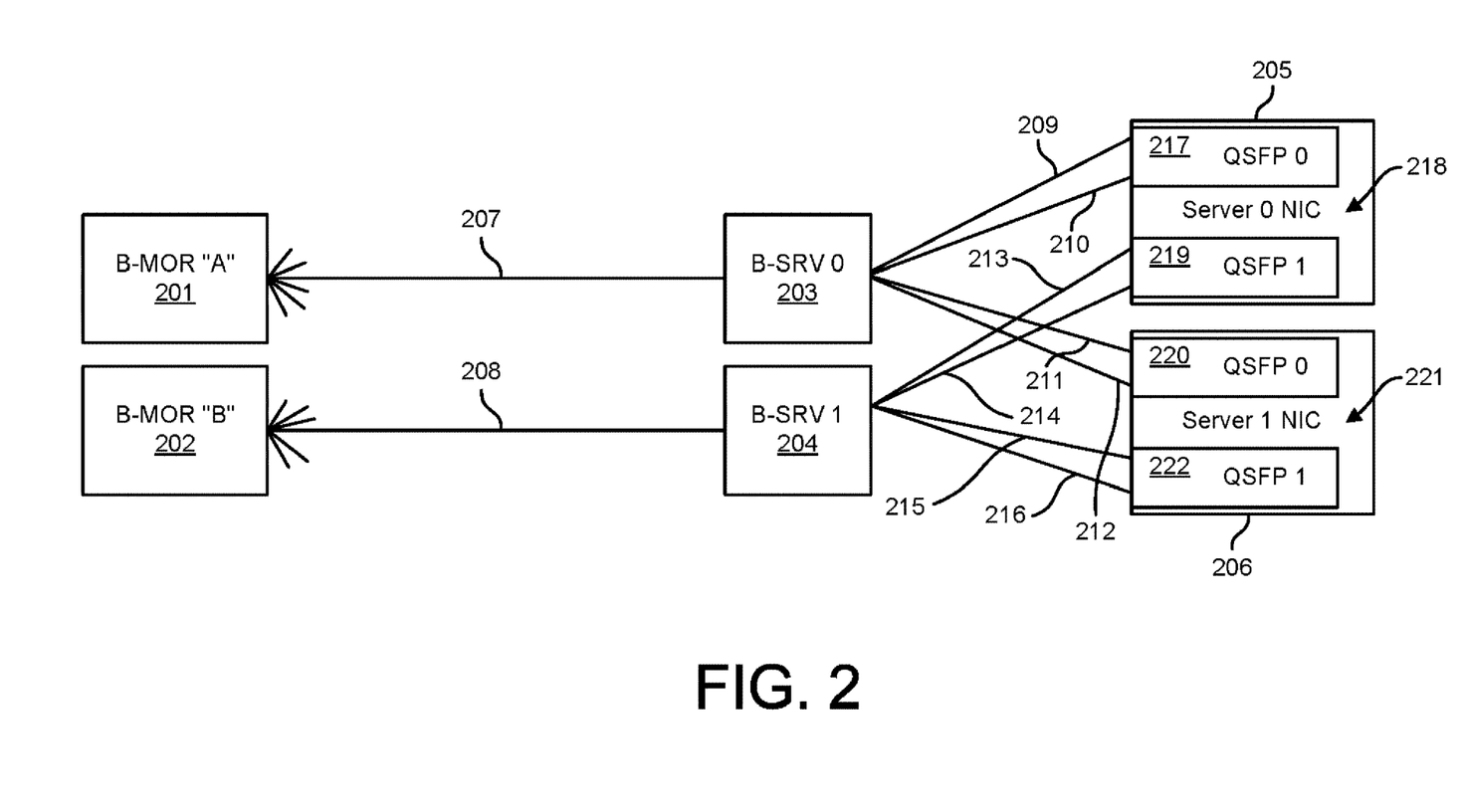
FIG. 2 is an illustration of a pair of MOR-compliant photonics transceiver devices optically coupled to a QSFP-compliant photonic transceiver set.

FIG. 2 is an illustration of a pair of MOR-compliant optical transceiver devices 201, 202 optically coupled to a QSFP-compliant photonic transceiver set 203, 204 that are physically installed into a pair of redundantly-connected servers 205, 206. The MOR-compliant optical transceivers 201, 202 each have a plurality of optical cables 207, 208. Each optical cable 207, 208 is able to transmit multiple optical signals using multiple wavelengths to a server switch. As previously stated, other means such as using multiple fibers utilizing a single wavelength may be employed. In FIG. 2, although the transmission of optical signals is shown on one optical cable 207, 208, each of the MOR-compliant optical transceivers 201, 202 has and may use up to six optical fibers. One having ordinary skill in the art may appreciate that the present disclosure is not limited thereto as the MOR-compliant optical transceivers 201, 202 may have more than or less than the number of optical ports shown in the figure.

The optical signals are received at QSFP-compliant (or QSFP-DD-compliant or OSFP-compliant, or any other industry-standard interface) photonics transceiver sets 203, 204. Each optical cable 207, 208 transmits optical signals. In one embodiment, each optical cable 207, 208 transmits four colors of light in each direction by means of two fibers per cable. As such, each optical cable 207, 208 can transmit four colors of optical signals to the QSFP-compliant photonics transceiver sets 203, 204. Moreover, a single optical fiber within cable 207 carries four colors of light (per direction) and each color can be converted into a single electrical signal. Likewise, in the opposite direction, a single optical fiber (not shown) can transmit four colors of light and each color can be converted into a single electrical channel.

In one implementation, the data rate per fiber is 200 Gbps which are converted to four electrical channels resulting in a data rate of 50 Gbps (per direction). For a dual set of server-end QSFP-compliant devices, each server-end QSFP-compliant device has two electrical channels (per direction).

However, in an implementation when two fibers per direction (four colors of light per fiber) per MOR switch is employed with a data rate of 200 Gbps per fiber, the aggregate data rate is 400 Gbps. The total number of electrical channels is eight and therefore the data rate per channel is 50 Gbps. For a single primary and secondary server-end QSFP-device configuration, each device has four electrical channels with an aggregate data rate of 200 Gbps per device.

Likewise, in an implementation when four fibers per direction (four colors of light per fiber) per MOR switch is employed with a data rate of 25 Gbps per color, the aggregate data rate is 100 Gbps per fiber. The total number of electrical channels is sixteen and the data rate per electrical channel is 25 Gbps (per direction). For a single primary and secondary server-end quad small form-factor pluggable double density (QSFP-DD) or octal small format pluggable OSFP device configuration, each device can have up to eight electrical channels (per direction). In addition, if the data rate per color is 25, the aggregate data rate per device is 200 Gbps per device. One having ordinary skill in the art may appreciate that each photonic communications scheme and data rate will have a resultantly different aggregate data rate per device.

Once received, the QSFP-compliant photonics transceiver sets 203, 204 can convert the optical signals into electrical signals. As will be discussed in this disclosure, a QSFP-compliant photonics transceiver set includes a primary server-end QSFP-compliant device, OSFP-DD-compliant device, OSFP-compliant device, or other industry-standard compliant device and at least one secondary server-end QSFP-compliant device. The secondary device can be of the same form factor as the primary device, or it may deviate. The primary and secondary server-end QSFP-compliant devices transmit the converted electrical signals to network interface cards 218, 221 of redundant servers 205, 206, respectively. The bi-directional transmission lanes 209-216 illustrate electrical signaling between the QSFP transceiver ports 217, 219, 220, 222 of redundant servers 205, 206.

It should be appreciated by one having ordinary skill in the art that the QSFP transceiver ports 217, 219, 220, 222 have the capacity to create four electrical channels via four data pins. Although FIG. 2 illustrates that only two QSFP data pins are used, the present disclosure is not limited thereto as other implementations may employ the use of all (e.g., four) QSFP data pins. For instance, if the QSFP-compliant photonics transceiver sets 203, 204 have a multi-parallel optimal (MPO) connector, they can convert optical signals received from a plurality of optical fibers into electrical signals.

Figure 3:
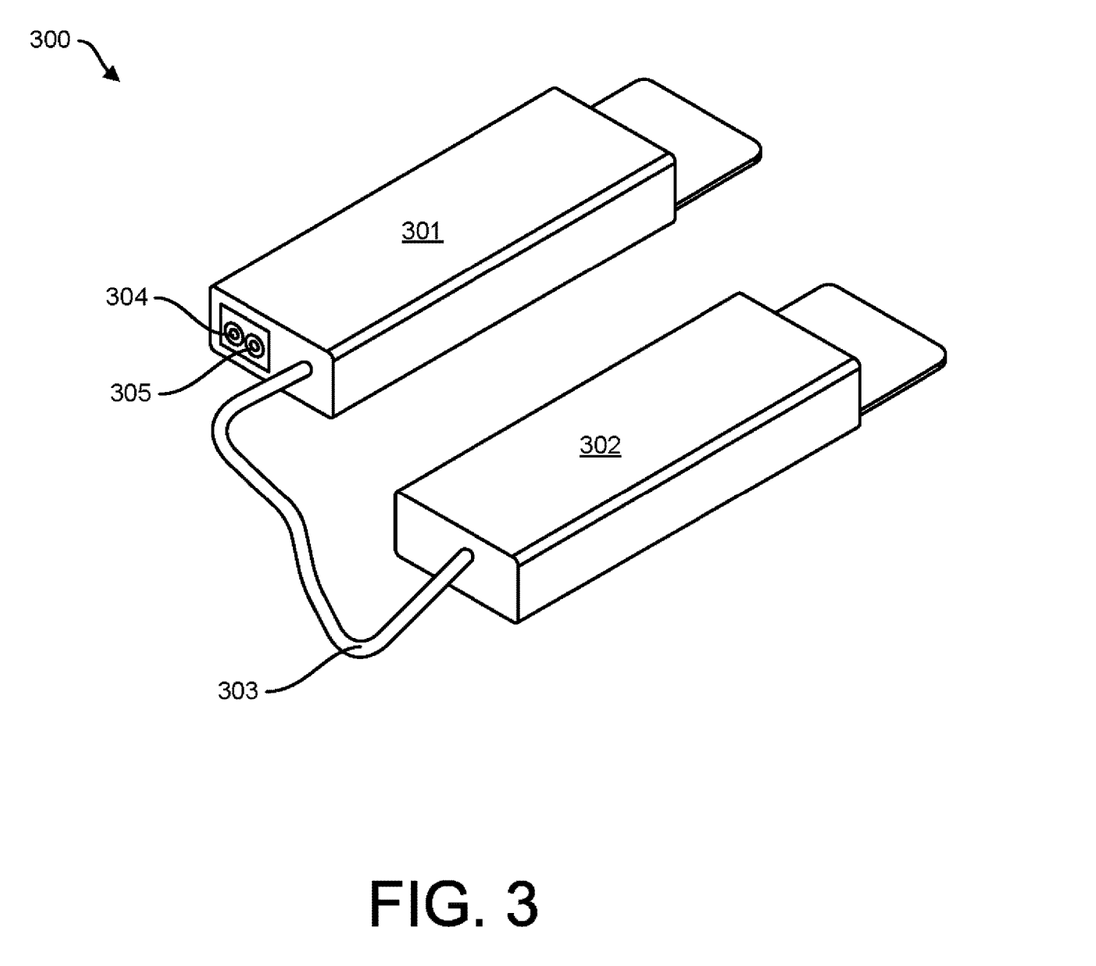
FIG. 3 is an illustration of a dual set of server-end QSFP-compliant devices in accordance with one embodiment of the present disclosure.

FIG. 3 is an illustration of a dual set of server-end QSFP-compliant devices 300 in accordance with one embodiment of the present disclosure. As shown, a dual set of server-end QSFP-compliant devices 300 can affect a single photonics connection and two sets of electrical connections to transmit and receive data from a network interface card of a server. In this disclosure, the dual set of server-end QSPF-compliant devices 300 may be referred to as a QSFP-compliant photonics transceiver set when referring to the devices as a single functional unit. Otherwise, when referring to the sub-components individually, they may be referred to as primary or secondary server-end QSFP-compliant devices.

The dual set of server-end QSFP-compliant device 300 comprises a primary server-end QSFP-compliant device 301 and a secondary server-end QSFP-compliant device 302. In one embodiment of the present disclosure, the primary server-end QSFP-compliant device 301 receives optical signals (e.g., from a MOR switch), converts the optical signals to electrical signals, and routes a subset of the electrical signals to the secondary server-end QSFP-compliant device 302.

The primary server-end QSFP-compliant device 301 includes a photonics transceiver (not shown) that can convert optical and electrical signals and transmit converted signals to a MOR switch or server or other destination. Secondary server-end QSFP-compliant device 302 includes an electrical transmitter to send electrical signals to a server system, particularly a redundant server system. Accordingly, as the dual set of server-end QSFP-compliant devices 300 makes use of a single photonics transceiver (a component of the primary server-end QSFP-compliant device) to transmit sets of electrical signals to different servers within a server system, the present disclosure can be employed to save costs with the reduction of hardware (e.g., a photonics transceiver per dual set of server-end QSFP-compliant devices) per server tray.

In the embodiment shown, the primary server-QSFP-compliant device 301 includes a duplex optical connection with an optical input port 304 and an optical output port 305 to send and receive optical signals. It should be noted that other photonic connections may be used as would be suitable for a greater number of fibers. MPO connectors, for example, would be used for a parallel optical interface having more than a single input and output fiber.

The primary server-end QSFP compliant device 301 can route electrical signals to the secondary server-end QSFP-compliant device 302 via an electrical cable 303. In one implementation, primary server-end QSFP-compliant device 301 routes approximately half of the converted electrical signals to the secondary server-end QSFP-compliant device 302. The primary server-end QSFP-compliant device 301 and the secondary server-end QSFP-compliant device 302 may work in tandem to employ redundancy in server systems.

As will be described below, a dual set of server-end QSFP-compliant devices 300 may not be limited to a single primary server-end QSFP-compliant device and a single secondary QSFP-compliant device but may include a single primary server-end QSFP-compliant device and a plurality of secondary server-end QSFP-compliant devices. In addition, the present disclosure is not limited to a primary server-end QSFP-compliant device with duplex optical connections but may include a MPO connector as will be described below.

Figure 4:
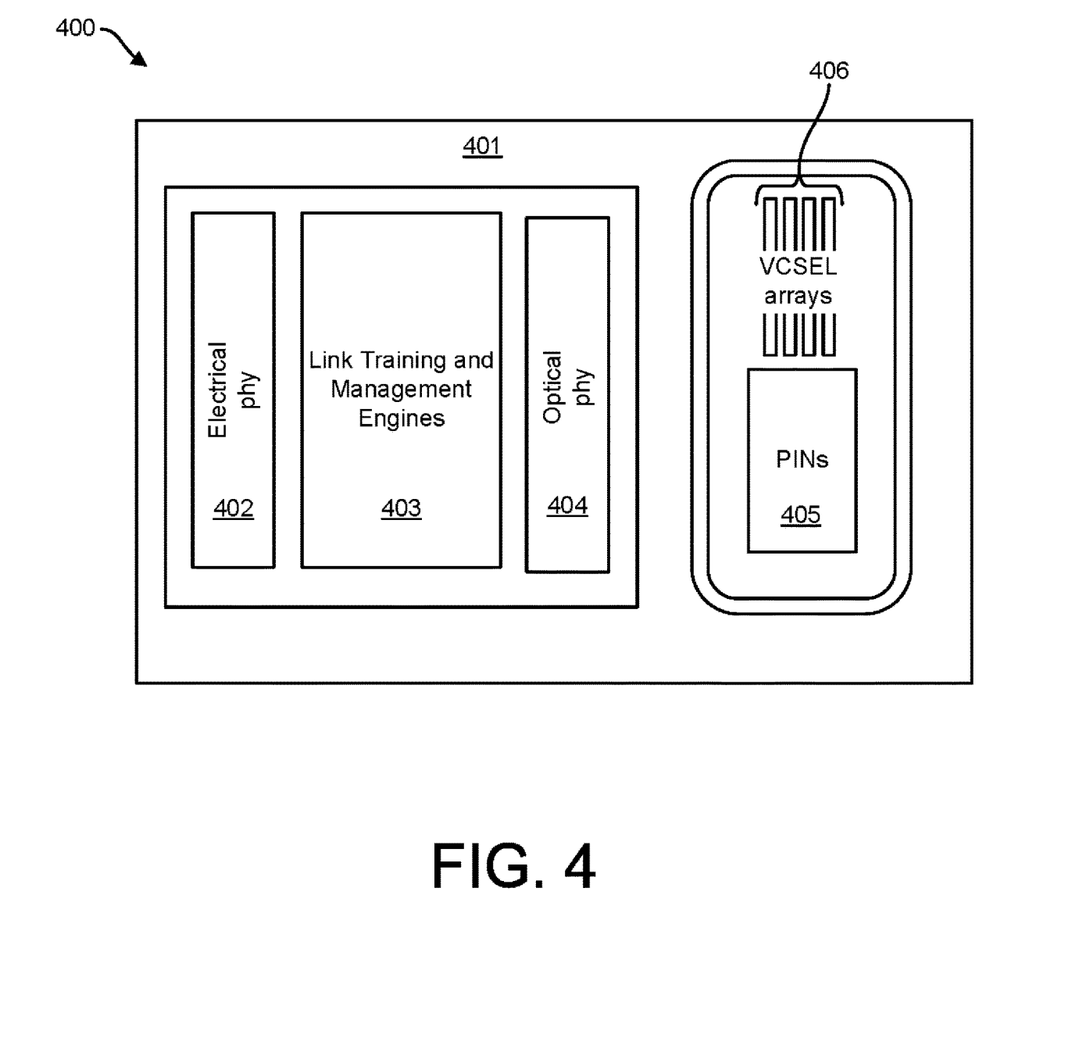
FIG. 4 is an exemplary internal photonics engine of a primary QSFP-compliant transceiver device in accordance with one embodiment of the present disclosure.

FIG. 4 is an exemplary internal photonics engine of a primary QSFP-compliant transceiver device 400 in accordance with one embodiment of the present disclosure. The primary QSFP-compliant photonics transceiver device 400 includes an electrical physical layer 402, link and training management engines 403, and optical physical layer 404 all disposed on a substrate 401 (e.g., PCB). In addition, the primary QSFP-compliant photonics transceiver 400 includes a set of photodiodes 405 and a set of Vertical-Cavity Surface-Emitting Lasers (VCSELs). It will be appreciated by one having ordinary skill in the art that this exemplary photonics engine may be replaced by a number of photonic technologies, such as, but not limited to Silicon Photonics technologies, CWDM technologies, DWDM technologies, PAM-4 and PAM-8 technologies, or any photonic technology suitable for providing multiple electrical channels from a single input fiber or fiber bundle.

Figure 5:
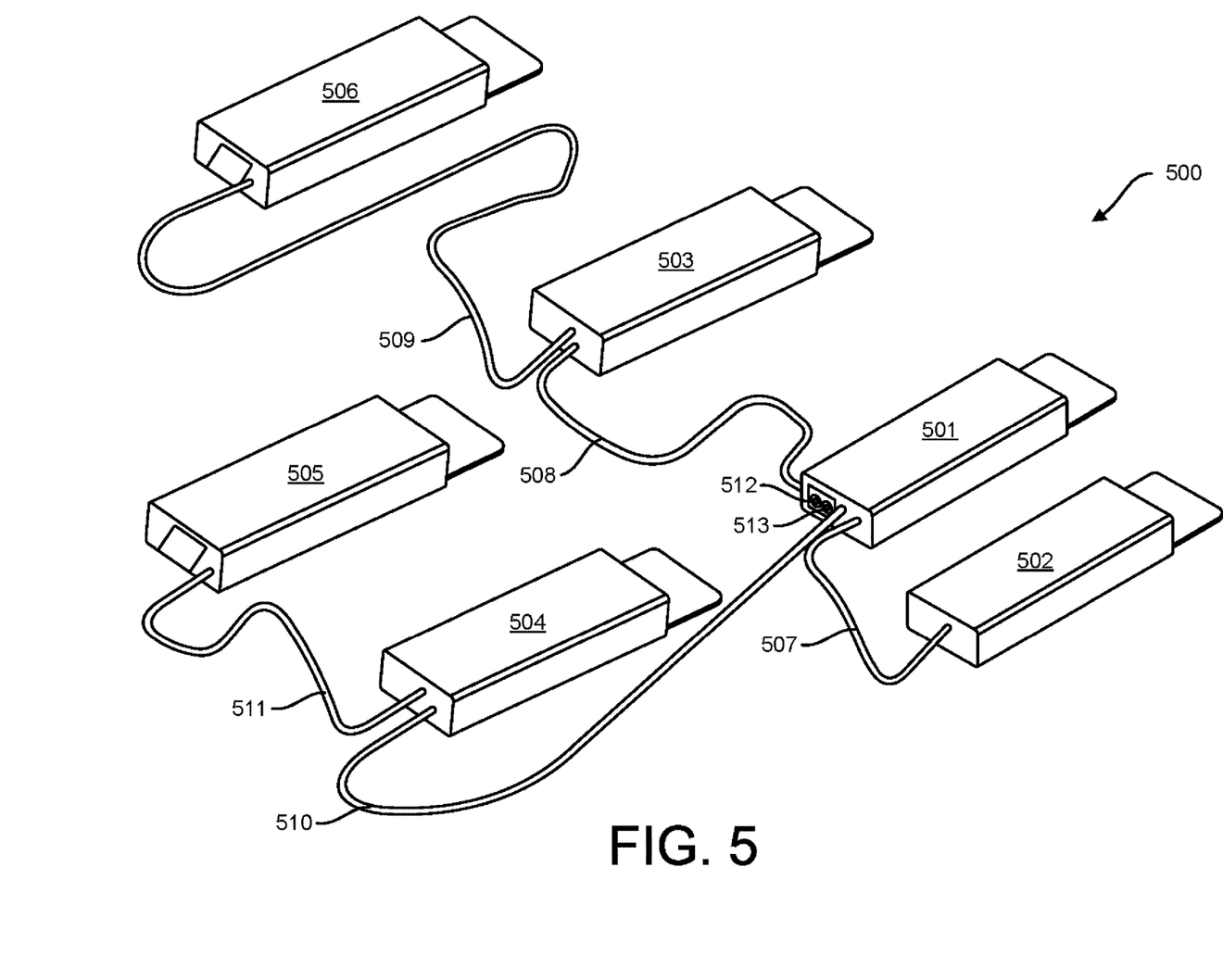
FIG. 5 is an illustration of a set of server-end QSFP-compliant devices in accordance with one embodiment of the present disclosure.

FIG. 5 is an illustration of a set of server-end QSFP-compliant devices 500 in accordance with one embodiment of the present disclosure. The set of server-end QSFP-compliant devices 500 include primary server-end QSFP-compliant device 501 and five secondary server-end QSFP-compliant devices 502-506. In one embodiment, the primary server-end QSFP-compliant device 501 includes a duplex optical connection with a single input fiber 512 and a single output fiber 513 to receive and transmit optical signals. This configuration is useful for applications where many wavelengths are employed, such as, but not limited to, DWDM implementations. Alternatively, primary server-end QSFP-compliant device 501 may employ a parallel optical connector, such as a MPO connector, in order to facilitate multiple fibers in each direction. Each of the secondary server-end QSFP-compliant devices include electrical circuitry to receive electrical signals, a transmitter to send the electrical signals to a server, and electrical circuitry to route a portion of the electrical signals to another secondary server-end QSFP-compliant device. Notably, these secondary signal routings may include re-drive or ret-time capability or they may simply pass the electrical signals through to the next module with no signal conditioning.

The set of server-end QSFP-compliant devices 500 display a parallel configuration such that each secondary server-end QSFP-compliant device receives optical signals routed from the primary server-end QSFP-compliant device. As shown, primary server-end QSFP-compliant device 501 is connected directly to secondary server-end QSFP-compliant device 502 (via cable 507), secondary server-end QSFP-compliant device 503 (via cable 508), and secondary server-end QSFP-compliant device 504 (via cable 510).

Notably, a secondary server-end QSFP-compliant device 505 is connected to secondary server-end QSFP-compliant device 504 (via cable 511) rather than having a direct connection to primary server-end QSFP-compliant device 501. Likewise, a secondary server-end QSFP-compliant device 506 is connected to secondary server-end QSFP-compliant device 503 (via cable 509).

In one embodiment, cables 507, 508, and 510 have a bundle of eight electrical signal pairs per direction whereas cables 509, 511 have a bundle of four electrical signal pairs per direction. In this embodiment, cable 510 provides four signal pairs per direction for four signal pairs per direction for electrical connections to secondary server-end QSFP-compliant device 504 with primary server-end QSFP-compliant device 501 and four signal pairs per direction for four electrical connections to secondary server-end QSFP-compliant device 505 with primary server-end QSFP-compliant device 501. The electrical signal pairs in cable 510 are packaged alongside the electrical signal pairs in cable 511. Likewise, cable 508 provides four electrical signal pairs per direction for four electrical connections to secondary server-end QSFP-compliant device 504 and four electrical signal pairs per direction for secondary server-end QSFP-compliant device 505. In one embodiment, four of the electrical signal pairs per direction in cable 508 are packaged alongside the electrical wires in cable 509. If each server-end QSFP-compliant device is used to their full capacity, the set of server-end QSFP-compliant devices 500 can employ an aggregate of twenty-four electrical channels in each direction.

In one embodiment, when the input and output fibers 512, 513 of primary server-end QSFP-compliant device 501 are replaced with a MPO connection, six fibers (four colors of light per fiber) per direction may be connected per MOR switch with a data rate of 200 Gbps per fiber, the aggregate data rate is 1200 Gbps. The total number of electrical channels is twenty-four and therefore the data rate per channel is approximately 50 Gbps per direction. For a single primary and five secondary server-end QSFP-compliant device configuration, each server-end QSFP-compliant device has four electrical channels with an aggregate data rate of 200 Gbps per device per direction. In this embodiment, the set of server-end QSFP-compliant devices 500 maximizes the electrical connection capacity. It should be recognized by those skilled in the art that this is only exemplary and that other combinations (e.g., eight channels of 50G per channel per direction, four channels of 100 G per channel per direction, etc.) are possible.

Figure 6:
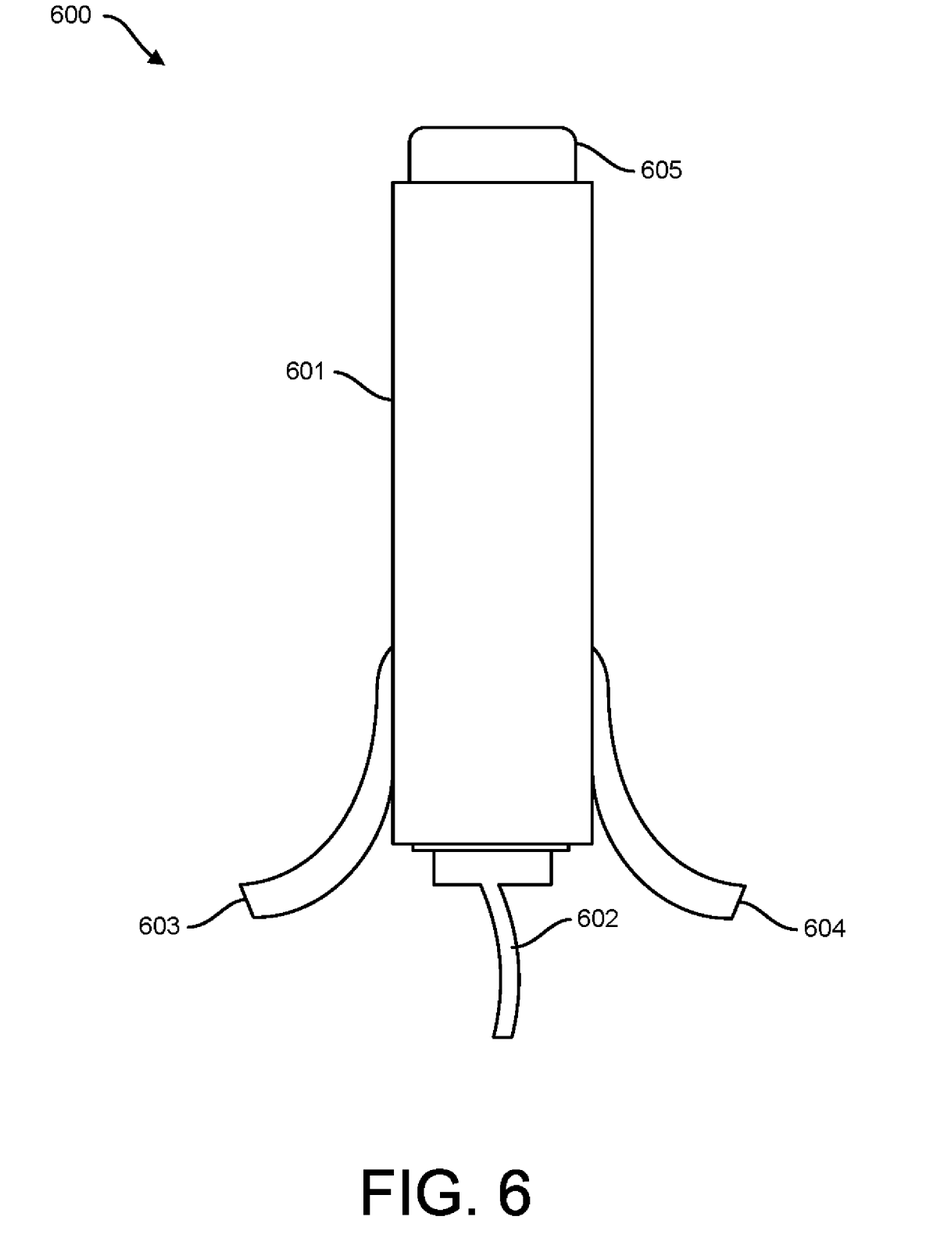
FIG. 6 is an illustration of a hybrid server-end QSFP-compliant device suitable for hardware configurations that employ three servers per tray (or shelf) in a rack in accordance with one embodiment of the present disclosure.

FIG. 6 is an illustration of a hybrid QSFP-compliant device 600 suitable for hardware configurations that employ three servers per tray (or shelf) in a rack in accordance with one embodiment of the present disclosure. Hybrid QSFP-compliant device 600 is suitable for server systems that are designed to connect to three servers per server tray. Hybrid QSFP-compliant device 600 includes a primary server-end QSFP-compliant device 601 to convert optical signals received via a MPO connector 602 into electrical signals and transmits them to a server via a QSFP, QSFP-DD, or OSFP connector 605 at the end of the primary server-end QSFP-compliant device 601.

Primary server-end QSFP-compliant device 601 includes electrical cables 603, 604 extending at an angle alongside the primary server-end QSFP-compliant device 601. The electrical cables 603, 604 can connect two secondary server-end QSFP-compliant devices (not shown in this figure). Primary server-end QSFP-compliant 601 routes the converted electrical signals to and from secondary server-end QSFP-compliant devices (not shown in this figure) via cables 603, 604. In one embodiment, primary server-end QSFP-compliant device 601 may route one-third of the converted electrical signals to each secondary server-end QSFP-compliant device via cables 603, 604.

Figures 7A, 7B:
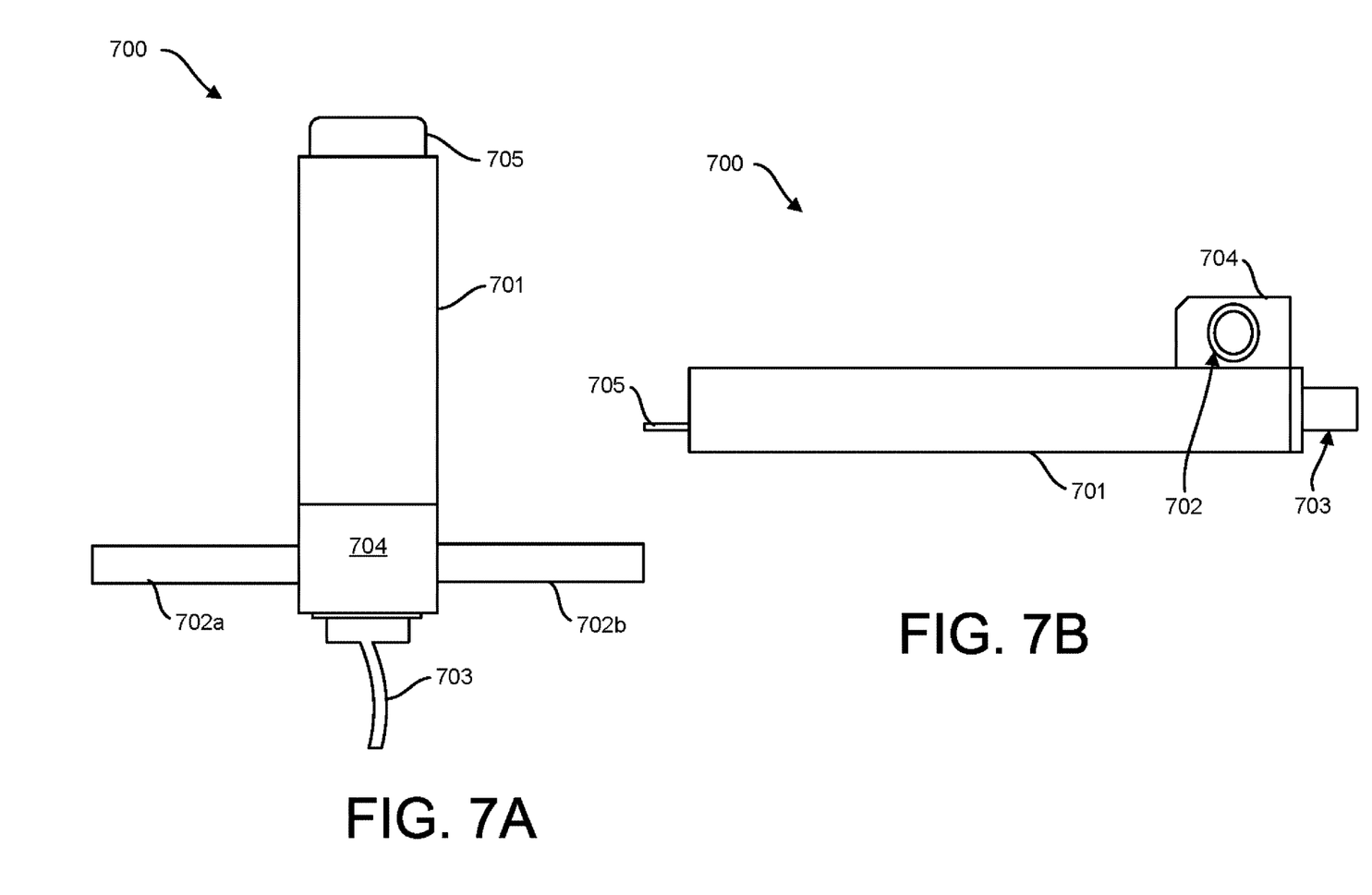
FIGS. 7A-7B are illustrations of yet another hybrid server-end QSFP-compliant device in accordance with an embodiment of the present disclosure.

FIGS. 7A-7B are illustrations of yet another hybrid server-end QSFP-compliant device 700 in accordance with one embodiment of the present disclosure. Hybrid QSFP-compliant device 700 is suitable for server systems that are designed to connect to three servers per tray. Primary server-end QSFP-compliant device 701 can convert optical signals received via a MPO connector 703 into electrical signals and transmits them to a server via a QSFP, QSFP-DD, or OSFP connector 705 at the end of the primary server-end QSFP-compliant device 701.

Primary server-end QSFP-compliant device 701 includes electrical cables 702a, 702b extending at an angle perpendicular to primary server-end QSFP-compliant device 701. The electrical cables 702a, 702b can connect two secondary server-end QSFP-compliant devices (not shown in this figure). Primary server-end QSFP-compliant device 701 routes the converted electrical signals to the secondary server-end QSFP-compliant devices (not shown in this figure) via cables 702a, 702b. In one embodiment, primary server-end QSFP-compliant device 701 may route one-third of the converted electrical signals to each secondary server-end QSFP-compliant device via cables 702a, 702b.

FIG. 7B illustrates a side view of the hybrid QSFP-compliant device 700. The side view exposes a cable housing 704. Cable housing 704 provides a 90-degree angle for wiring which is easier to manufacture and shortens the required length needed for the wire cables. Cable housing 704 exposes the cables 702a, 702b to the electrical circuitry within the primary server-end QSFP-compliant device 701.

Figure 8:
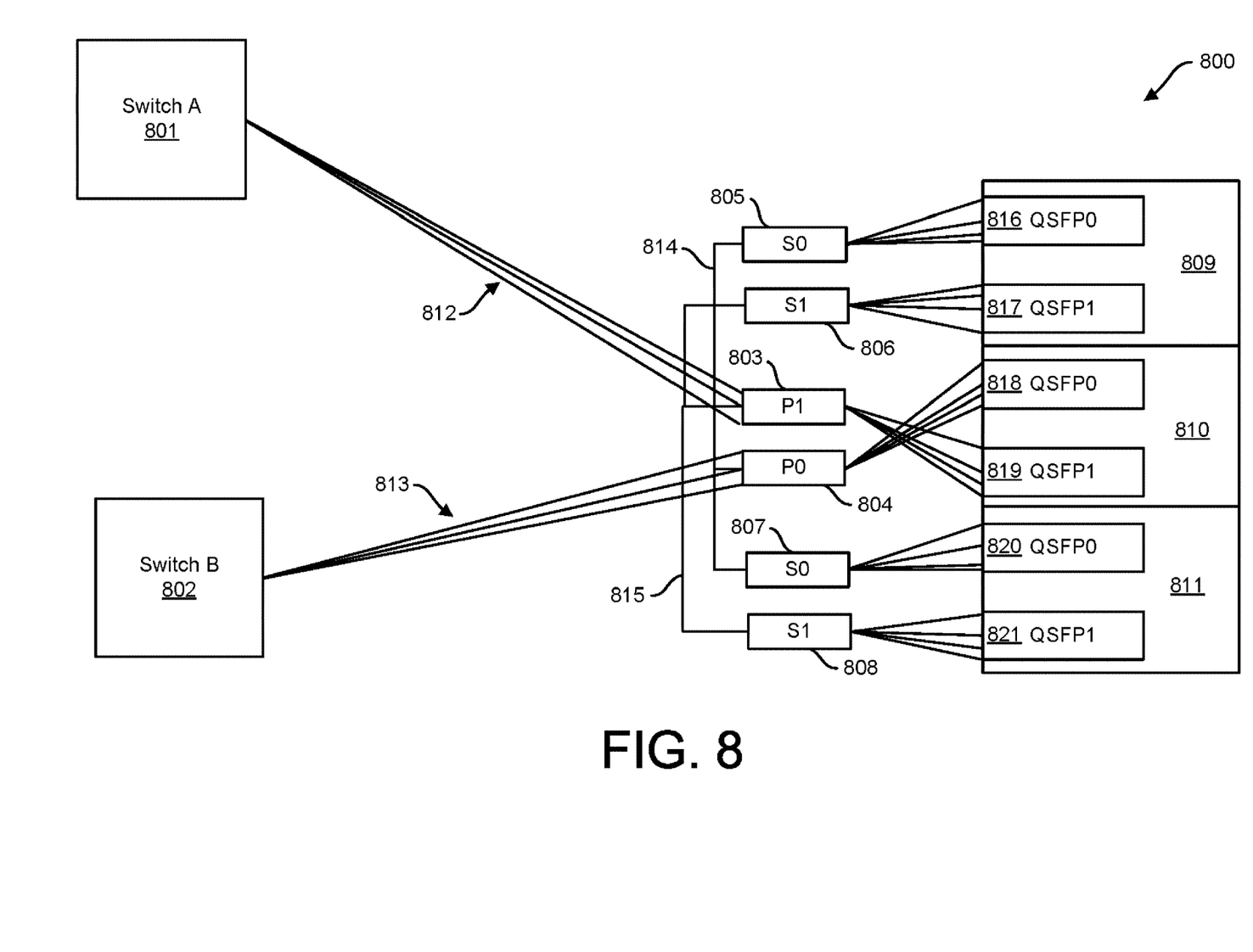
FIG. 8 is an illustration of a server system which illustrates MOR switch-to-server and transceiver-server optical and electrical connections in accordance with one embodiment of the present disclosure.

FIG. 8 is an illustration of a server system 800 which illustrates MOR switch-to-server and transceiver-server optical and electrical connections in accordance with an embodiment of the present disclosure. The pair of MOR switches 801, 802 can transmit optical signals to the QSFP-compliant photonics transceiver sets 814, 815. The optical signals 812, 813 transmitted from the pair of switches 801, 802 may include four optical colors of light which when converted to electrical signals, represent four electrical signals.

Each QSFP-compliant photonics transceiver set has a primary server-end QSFP-compliant device and two secondary server-end QSFP-compliant devices. For example, QSFP-compliant photonics transceiver set 814 has primary server-end QSFP-compliant device 804 and two secondary server-end QSFP-compliant devices 805, 807. Likewise, QSFP-compliant photonics transceiver set 815 has primary server-end QSFP-compatible device 803 and two secondary server-end QSFP-compliant devices 806, 808.

In the embodiment shown, each server-end QSFP-compliant device transmits four electrical channels to the servers 809-811 via the QSFP ports 816-821. As there are six server-end QSFP-compliant devices 803-808 with an aggregate twenty-four electrical connections with servers 809-811, each MOR switch 801, 802 employs three optical cables with four colors of light, per direction, by means of two fibers per cable to provide for the twenty-four electrical connections on the server side.

In an implementation when three fibers (four colors of light per direction per fiber) per MOR switch is employed with a data rate of 400 Gbps (per direction), the aggregate data rate is 1200 Gbps per QSFP-compliant photonics transceiver set. The total number of electrical channels (per direction) is twelve and thus the data rate per channel is 100 Gbps. For a single primary and single secondary server-end QSFP-compliant device configuration, each server-end QSFP-compliant device has four electrical channels with an aggregate data rate of 400 Gbps per device (per direction). In the embodiment shown, the QSFP-compliant photonics transceiver set employs a QSFP connector.

In yet a different implementation, when six fibers (four colors of light per direction per fiber) per MOR switch are employed with a data rate of 100 Gbps (per direction), the aggregate data rate is 600 Gbps per QSFP-compliant photonics transceiver set. The total number of electrical channels (per direction) is twenty-four and therefore the data rate per channel is 25 Gbps. For a single primary and secondary server-end QSFP device configuration, each device has eight electrical channels with an aggregate data rate of 200 Gbps per device (per direction). As the present implementation has greater than four electrical channels per device, the QSFP-compliant photonics transceiver sets employ a QSFP-DD, OSFP, or other multi-channel connector.

In addition, the present disclosure may be implemented in various other manners. For example, a QSFP-compliant photonics transceiver set may include a single server-end QSFP-compliant device and three secondary server-end QSFP-compliant devices. In an implementation when two fibers (four colors of light per direction per fiber) per MOR switch are employed with a data rate per fiber of 400 Gbps (per direction), the aggregate data rate is 800 Gbps (per direction). In addition, the total number of electrical channels (per direction) is eight and thus the data rate per channel is 100 Gbps (per direction). In addition, there are two electrical channels per module have an aggregate data rate of 200 Gbps per module. In this embodiment, two of the four available QSFP data pins are used.

In another implementation when four fibers (four colors of light per direction per fiber) per MOR switch are employed with a data rate per fiber of 200 Gbps (per direction), the aggregate data rate is 800 Gbps (per direction). The total number of electrical channels (per direction)

is sixteen and thus the data rate per channel is 50 Gbps (per direction). In addition, there are four electrical channels per module with an aggregate data rate of 200 Gbps (per direction).

Advantageously, the present disclosure enables the use of an input fiber connection and a photonics transceiver to effect two sets of electrical connections on different servers within a redundant server system.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

While illustrative embodiments of the application have been described in detail herein, it is to be understood that the inventive concepts may be otherwise variously embodied and employed, and that the appended claims are intended to be construed to include such variations, except as limited by the prior art.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

We claim:

1. An apparatus, comprising:
    a primary server-end transceiver device, the primary server-end transceiver device comprising a photonics transceiver and a first electrical transmitter;
    a first secondary server-end transceiver device, the first secondary server-end transceiver device comprising a second electrical transmitter;
    a first electrical cable to electrically couple the primary server-end transceiver device to the first secondary server-end transceiver device; and
    a second secondary server-end QSFP-compliant device to electrically connect to the first secondary server-end transceiver device by a second electrical cable wherein the first electrical cable comprises a first bundle of electrical wires that facilitates an electrical connection between the primary server-end transceiver device and the first secondary server-end transceiver device and a second set of wires that facilitate an electrical connection between the primary server-end transceiver device and the second secondary server-end transceiver device.

2. The apparatus of claim 1 further comprising a second secondary server end QSFP-compliant device to electrically connect to the primary server-end transceiver device by a second electrical cable.

3. The apparatus of claim 1, wherein the primary server-end transceiver device is Coarse Wavelength Division Multiplexing (CWDM) compliant.

4. The apparatus of claim 1, wherein the primary server-end transceiver device comprises a duplex optical fiber connection.

5. The apparatus of claim 1, wherein the primary server-end transceiver device is to provide electrical signaling to a first server and the first secondary server-end transceiver device is to provide electrical signaling to a second server.

6. The apparatus of claim 1, wherein the first secondary server-end transceiver device is to provide auxiliary power to the primary server-end transceiver device via the first electrical cable.

7. The apparatus of claim 1, wherein the primary server-end transceiver device is QSFP-compliant.

8. A server system, comprising:
    a first server, comprising:
        a first transceiver port; and
        a first network interface card (NIC);
    a second server, comprising:
        a second transceiver port; and
        a second network interface card (NIC); and
    a first dual set of server-end transceiver devices, comprising:
        a primary server-end transceiver device physically connected to the first transceiver port of the first server and electrically coupled to the first NIC; and
        a secondary server-end transceiver device physically connected to the second transceiver port of the second server and electrically coupled to the second NIC, the secondary server-end transceiver device is to be connected to the primary server-end transceiver device by a first electrical cable, wherein the first electrical cable is to facilitate the transmission of converted electrical signals from the primary server-end transceiver device and the secondary server-end transceiver device.

9. The server system of claim 8, wherein the primary server-end transceiver device comprises a multi-parallel optimal (MPO) connector.

10. The server system of claim 8 further comprising a switch optically coupled to the primary server-end transceiver device.

11. A redundant server system, comprising:
    a first server, comprising:
        a first QSFP port; and
        a second QSFP port;
    a second server, comprising:
        a third QSFP port; and
        a fourth QSFP port; and
    a first dual set of server-end QSFP-compliant devices, comprising:

a first server-end QSFP-compliant device coupled to a second server-end QSFP-compliant device by a first electrical cable, the first server-end QSFP-compliant device connected to the first QSFP port of the first server and the second server-end QSFP-compliant device electrically coupled to the third QSFP port of the second server;

wherein the first dual server-end QSFP-compliant device and the second dual server-end QSFP-compliant device are operable to provide electrical signaling to the first server and the second server according to a PAM-4 electrical transmission protocol.

12. The redundant server system of claim 10 further comprising:
a second dual set of server-end QSFP-compliant devices, comprising:
a third server-end QSFP-compliant device coupled to a fourth server-end QSFP device by a second electrical cable, the third serve-end QSFP-compliant device connected to the second QSFP port of the first server and the fourth server-end QSFP-compliant device electrically coupled to the fourth QSFP port of the second server.

13. The redundant server system of claim 10, wherein each of the first QSFP port, the second QSFP port, the third QSFP port, and the fourth QSFP port can transmit four colors of light per direction per port.

14. The redundant server system of claim 10, wherein each of the first QSFP port, the second QSFP port, the third QSFP port, and the fourth QSFP port has a data transmission bandwidth between 200 Gbps-400 Gbps.

15. The redundant server system of claim 10, wherein the first server-end QSFP-compliant device is operable to transmit approximately half of converted electrical signals to the second server-end QSFP-compliant device.

16. The redundant server system of claim 10, wherein the first server-end QSFP-compliant device comprises at least one optical input port and at least one optical output port.

17. The redundant server system of claim 10, wherein the first server-end QSFP-compliant device is electrically coupled to a first network interface card (NIC) of the first server and the second server-end QSFP-compliant device is electrically coupled to a second NIC of the second server.

* * * * *